No. 821,015. PATENTED MAY 22, 1906.
E. O. BULMAN.
TWINE HOLDER.
APPLICATION FILED JULY 31, 1905.
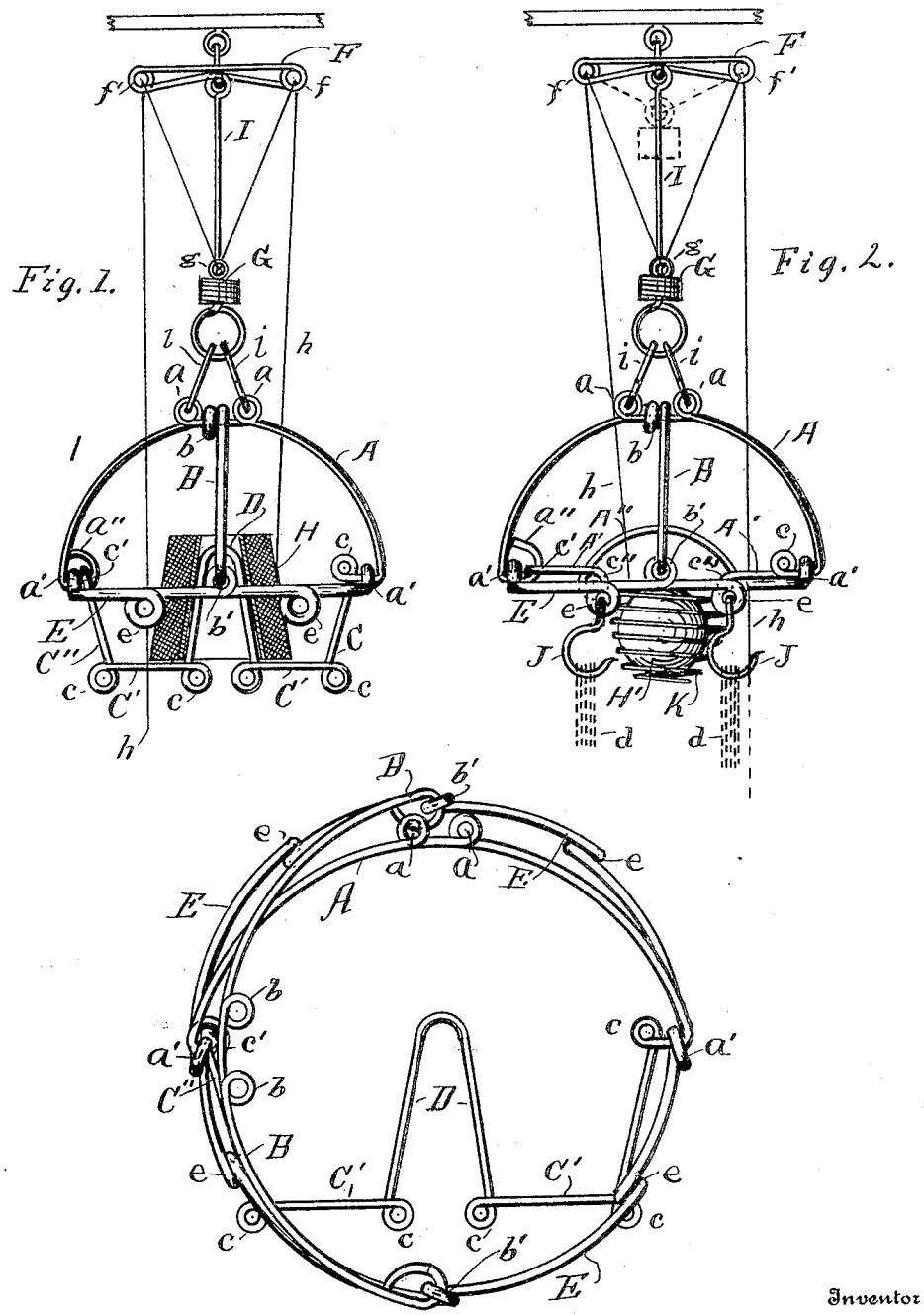
Witnesses
A. Allgier
Evan Johnson
Inventor
Elvah O. Bulman
By Ithriel J. Cilley
Attorney

UNITED STATES PATENT OFFICE.

ELVAH O. BULMAN, OF GRAND RAPIDS, MICHIGAN.

TWINE-HOLDER.

No. 821,015.  Specification of Letters Patent.  Patented May 22, 1906.

Application filed July 31, 1905. Serial No. 272,127.

*To all whom it may concern:*

Be it known that I, ELVAH O. BULMAN, a citizen of the United States, residing at Grand Rapids, in the county of Kent and State of Michigan, have invented certain new and useful Improvements in Twine-Holders, of which the following is a specification.

My invention relates to improvements in twine-holders for use in grocery and other stores where much twine is used for securing packages; and its objects are, first, to provide a twine-holder that may be readily and conveniently folded to a flat position for convenient shipping in knockdown condition, and, second, to provide a convenient "take-up" twine-holder that may be readily assembled or taken down and with which sacks may be stored without interfering with the manipulation of the twine. I attain these objects by the mechanism illustrated in the accompanying drawings, in which—

Figure 1 is an elevation of a twine-holder with which cones of twine are used. Fig. 2 is the same for storing balls of twine and provided with hooks for supporting paper sacks, &c.; and Fig. 3 is a plan of the holder shown in Fig. 1 folded flat ready for shipment or storage.

Similar letters refer to similar parts throughout the several views.

I prefer that this twine-holder be made of a reasonably-heavy spring-wire, this being more convenient and better adapted to bend to the several necessary forms than any other form of metal, and in its construction I form an annular base E, which is provided with two sets of loops $a'$ $a'$ and $b'$ $b'$ and may be provided with any desired number of loops $e$, into which hooks J or other convenient form of supports may be secured for holding paper sacks, as indicated by the dotted lines $d$, or other convenient purposes.

The bails A of both forms of holders—i. e., the form shown in Figs. 1 and 2—are constructed exactly alike down to the points where they are pivoted to the annular base E, both being provided with central loops $a$ $a$, by means of which they may be connected to the supporting-wire I by means of the links $i$ $i$. Proceeding now to describe the construction of the cone-holder shown in Fig. 1 the bail-wire is provided with a loop $a''$ at one end, which pivotally engages one of the loops $a'$ on the base E, whence the bail curves up to the loops $a$ $a$, which loops project upward from the bail to form a receptacle for the center of the bail B, thence it curves downward to and passes through the opposite loop $a'$ in base, and with the several loops $c$ and bodies C, C', C'', and D it forms the base and cone for supporting the conical spool of twine H, the upwardly-projecting portion D being of a proper shape to fit the opening in the spool, as shown, the spool and its twine being shown in section to disclose the construction of the portion D and how it supports the spool. The end C'' is pivotally secured to the loop $a''$ at $c'$, so that the bail A and the support C' D may be folded down almost parallel with the base E, as shown in Fig. 3.

The bail B is simply a supporting-bail to hold the base E in proper position and is pivotally attached to the base at the loops $b'$, so that it may be folded down, as indicated in Fig. 3, when storing or shipping the holder, or it may be thrown up, as in Figs. 1 and 2, to engage the bail A between the loops $a$ $a$, the bail B being provided with corresponding loops $b$, that project downward, thus locking the bails, so that neither one can be folded down parallel with the base until they are sprung apart and disengaged.

When it is desired to store a ball of twine, the portion C C' C'' D is replaced with a basket K, which is pivotally supported in the loops $c''$ $c''$ in the arms A' A'', the free end of which is secured to the loop $a''$ at $c'$. (See Fig. 2.)

To thread this holder, the twine is passed from the cone H or from the ball H' to the loop $f$ in the arm F and thence down to the weight G, where it passes through the loop $g$ and back up to the loop $f'$ and thence down to convenient position to be reached by the operator, it being understood that when the twine is drawn down, as indicated by its dotted lines in Fig. 2, the weight is drawn up, as indicated by its dotted lines, so that when the desired amount of twine is reeled off of the ball and is broken off the weight will drop to normal position and draw the end of the twine up out of the way, so that it will not be dangling upon the counter or in the way of the operator or others.

Having thus fully described my invention, what I claim as new, and desire to secure by Letters Patent of the United States, is—

1. In wire-constructed implements, a base having loops formed at intervals and forming a circle, a bail pivotally connected with opposite loops, projecting beyond said loops and forming a twine-receptacle, a bail pivotally attached to loops in the base at right angles with the first-mentioned bail, said bails having interlocking loops at the point of contact, and a supporting-rod.

2. In a twine-holder, an annular base having loops at intervals, a bail pivotally attached to opposite loops in said base, passing beyond said base and forming a twine-support, a second bail pivotally attached to the base at right angles to the first-mentioned bail, said bails having interlocking loops at the point of contact, a supporting-rod connected with the bails and having loops for threading the twine, and an adjustable weight upon said rod for taking up the slack of the twine, substantially as and for the purpose set forth.

3. In a folding twine-holder, an annular base having loops, bails pivoted in said loops at right angles with each other and having interlocking contact-points, a twine-holder connected with one of said bails, and a supporting-rod and take-up weight, substantially as and for the purpose set forth.

Signed at Grand Rapids, Michigan, July 29, 1905.

ELVAH O. BULMAN.

In presence of—
ITHIEL J. CILLEY,
F. G. FRIEND.